Patented Oct. 13, 1953

2,655,536

UNITED STATES PATENT OFFICE 2,655,536

PREPARATION OF ALPHA-ACETAMIDO-BETA-HYDROXYPROPIOPHENONES

Oliver De Garmo, St. Louis, and David B. Guthrie, Glendale, Mo., assignors to Monsanto Chemical Company, St. Louis, Mo., a corporation of Delaware No Drawing. Application March 14, 1951, Serial No. 215,662

13 Claims. (Cl. 260—562)

This invention relates to alpha-acetamido-beta-hydroxypropiophenones; more specifically, this invention relates to an improved process for the production of alpha-acetamido-beta-hydroxypropiophenones having the formula

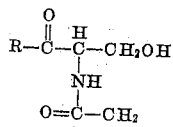

wherein R represents a phenyl radical.

α-acetamido-β-hydroxypropiophenones are valuable intermediates in the preparation of pharmaceuticals. Heretofore these materials have been prepared by the hydroxymethylation of α-acetamidoacetophenones. This process was carried out by the reaction of α-acetamidoacetophenones with formaldehyde in the presence of a small amount of sodium bicarbonate, and this reaction may be represented by the following equation:

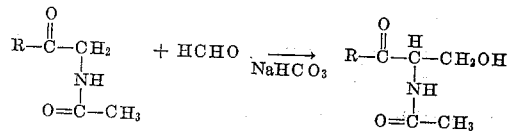

wherein R represents a phenyl radical. This method of preparation as heretofore used resulted in an erratic and unfavorably low yield of the desired product.

It is an object of this invention to provide an improved process for the preparation of α-acetamido-β-hydroxypropiophenones. Further objects will become apparent from a description of the invention which follows.

It has now been discovered that if the reaction of an α-acetamidoacetophenone and formaldehyde is carried out under controlled pH conditions, a highly improved yield of α-acetamido-β-hydroxypropiophenone results. According to the novel process of this invention, therefore, highly improved yields of α-acetamido-β-hydroxypropiophenones are obtained by reacting an α-acetamidoacetophenone having the formula:

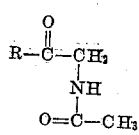

wherein R represents a phenyl radical, and formaldehyde while maintaining a pH below about 9.0 and preferably in the range of from about 8.0 to about 9.0. The following examples are illustrative of the novel improved process of this invention:

Example I 18.2 g. of p-nitro-α-acetamidoacetophenone is slurried in 63.5 ml. of 95% ethanol and 22.5 ml. of water. While maintaining a temperature of about 30–35° C., 14.4 ml. of a 37% formaldehyde solution and 0.85 g. of sodium bicarbonate are added. The resultant mixture is stirred for approximately two hours while maintaining a temperature of approximately 30°–35° C. during which time small amounts of glacial acetic acid are periodically added in order to maintain the pH of the reaction mixture in the range of from about 8.0 to about 9.0. A total of about 0.4 g. of acetic acid is required for this purpose.

The batch is then cooled to about 5° C. and the p-nitro α-acetamido-β-hydroxypropiophenone filtered therefrom. The filter cake is washed with water, a dilute hydrochloric acid solution and finally with another portion of water. The washed p-nitro-α-acetamido-β-hydroxypropiophenone is then dried. The amount of p-nitro-α-acetamido-β-hydroxypropiophenone recovered represents approximately an 86% yield based upon p-nitro-α-acetamidoacetophenone initially charged.

Example II

The procedure set forth in Example I is repeated with the exception that no acetic acid is added during the reaction and no attempt is made to control the pH during the reaction. Approximately a 65% yield of p-nitro-α-acetamido-β-hydroxypropiophenone is obtained.

Example III

The procedure set forth in Example I is repeated utilizing 15.1 g. of α-acetamidoacetophenone in place of the 18.2 g. of p-nitro-α-acetamidoacetophenone. An excellent yield of α-acetamido-β-hydroxypropiophenone is obtained.

Example IV

The procedure set forth in Example I is repeated utilizing 16.1 g. of p-chloro-α-acetamidoacetophenone in place of the 18.2 g. of p-nitro-α-acetamidoacetophenone. An excellent yield of p-chloro-α-acetamido-β-hydroxypropiophenone is obtained.

Example V

The procedure set forth in Example I is repeated utilizing 16.4 g. of p-methoxy-α-acetamidoacetophenone in place of the 18.2 g. of p-nitro-α-acetamidoacetophenone. An excellent yield of p-methoxy-β-acetamido-β-hydroxypropiophenone is obtained.

Example VI

The procedure set forth in Example I is repeated utilizing potassium carbonate in place of the sodium bicarbonate and sulfuric acid in place of the acetic acid to maintain the pH of the reaction mixture in the range of from 8.0 to 9.0. The yield of p-nitro-α-acetamido-β-hydroxypropiophenone thus obtained is comparable to that obtained in Example I.

While the preceding examples have set forth specific embodiments of the novel improved process of this invention, it will be obvious to those skilled in the art that a substantial variation in these examples is possible without departing from the scope of this invention. Any α-acetamidoacetophenone having the formula

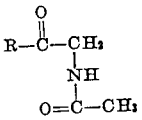

wherein R represents a phenyl radical may be utilized in the novel process of this invention. The phenyl radical can be unsubstituted or substituted with one or more substituents. Typical, but not limitative, of such substituents are the halogens such as chlorine, bromine, iodine and fluorine; nitro groups; alkyl radicals such as methyl, ethyl, propyl, isopropyl, butyl, etc.; alkoxy groups, such as methoxy, ethoxy, propoxy, etc.

The quantity of reactants utilized in the novel process of this invention may be varied over a substantial range. It is preferred that at least a one molecular proportion of formaldehyde be utilized for each one molecular proportion of α-acetamidoacetophenone. While it is preferred that monomeric formaldehyde be utilized in the novel process of this invention, and preferably in the form of an aqueous solution of formaldehyde, the formaldehyde may be supplied or used in its polymeric form, i. e., as paraformaldehyde. Excessive quantities of formaldehyde have no deleterious effect upon the reaction, and as high as four or even ten molecular proportions of formaldehyde may be utilized for each one molecular proportion of α-acetamidoacetophenone.

The reaction may be carried out in any type of an inert liquid medium. Typical of such mediums are water, the various alcohols, etc. Particularly useful reaction mediums are mixtures of water and water-miscible organic solvents such as methyl and ethyl alcohol.

The temperature at which the novel improved process of this invention is carried out may also be varied over a substantial range. It is preferably carried out at a temperature in the range of from about 20° C. to about 50° C. although it may be carried out at any temperature between the freezing point and boiling point of the reaction mixture either under atmospheric pressure, sub-atmospheric pressure or super-atmospheric pressure.

According to the novel process of this invention, the pH of the reaction mixture is maintained below about 9.0 throughout the major portion of this reaction and preferably in the range of from about 8.0 to about 9.0. This pH control is obtained by the addition of suitable basic or acidic agents as the case may be. Typical of the basic agents which may be utilized are the alkali metal carbonates and bicarbonates, such as the carbonates and bicarbonates of sodium and potassium, alkaline phosphate salts, the various alkali metal and alkaline earth metal hydroxides, sodium acetate, etc. The various acidic agents which may be utilized to effect proper pH control are illustrated by acetic acid, phosphoric acid, sulfuric acid, hydrochloric acid, etc.

After the reaction is complete, the α-acetamido-β-hydroxypropiophenone may be recovered from the reaction mixture by any method well known to those skilled in the art. Preferably, the α-acetamido-β-hydroxypropiophenone is separated from the reaction mixture by cooling and recovered by filtration.

What is claimed is:

1. In a process for the preparation of an α-acetamido-β-hydroxypropiophenone, the step comprising reacting an α-acetamidoacetophenone having the formula

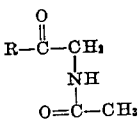

wherein R represents a phenyl radical selected from the class consisting of the unsubstituted phenyl radical and substituted phenyl radicals containing as their substituent groups halogens, nitro groups, alkyl groups, and alkoxy groups; and formaldehyde while maintaining a pH in the range of from about 8.0 to about 9.0.

2. In a process for the preparation of α-acetamido-β-hydroxypropiophenone, the step comprising reacting α-acetamidoacetophenone and formaldehyde while maintaining a pH in the range of from about 8.0 to about 9.0.

3. In a process for the preparation of a nitro-α-acetamido-β-hydroxypropiophenone, the step comprising reacting an α-acetamidoaceto-nitrophenone and formaldehyde while maintaining a pH in the range of from about 8.0 to about 9.0.

4. A process as described in claim 3 wherein the nitro-α-acetamidoacetophenone is p-nitro-α-acetamidoacetophenone.

5. In a process for the preparation of an α-acetamido-β-hydroxypropiophenone, the step comprising reacting a one molecular proportion of an α-acetamidoacetophenone having the formula

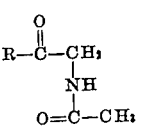

wherein R represents a phenyl radical selected from the class consisting of the unsubstituted phenyl radical and substituted phenyl radicals containing as their substituent groups halogens, nitro groups, alkyl groups, and alkoxy groups; and at least a one molecular proportion of formaldehyde while maintaining a pH in the range of from about 8.0 to about 9.0.

6. In a process for the preparation of α-acetamido-β-hydroxypropiophenone, the step comprising reacting a one molecular proportion of α-acetamidoacetophenone and at least a one molecular proportion of formaldehyde while maintaining a pH in the range of from about 8.0 to about 9.0.

7. In a process for the preparation of a nitro-α-acetamido-β-hydroxypropiophenone, the step comprising reacting a one molecular proportion of an α-acetamidoaceto-nitrophenone and at least a one molecular proportion of formaldehyde while maintaining a pH in the range of from about 8.0 to about 9.0.

8. A process as described in claim 7 wherein the nitro-α-acetamidoacetophenone is p-nitro-α-acetamidoacetophenone.

9. In a process for the preparation of an α-acetamido-β-hydroxypropiophenone, the step comprising reacting a one molecular proportion of an α-acetamidoacetophenone having the formula

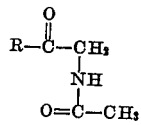

wherein R represents a phenyl radical selected from the class consisting of the unsubstituted phenyl radical and substituted phenyl radicals containing as their substituent groups halogens, nitro groups, alkyl groups, and alkoxy groups; and an aqueous solution containing at least a one molecular proportion of formaldehyde while maintaining a pH in the range of from about 8.0 to about 9.0.

10. In a process for the preparation of an α-acetamido-β-hydroxypropiophenone, the step comprising reacting a one molecular proportion of an α-acetamidoacetophenone having the formula

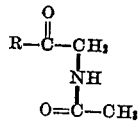

wherein R represents a phenyl radical selected from the class consisting of the unsubstituted phenyl radical and substituted phenyl radicals containing as their substituent groups halogens, nitro groups, alkyl groups, and alkoxy groups; and an aqueous solution containing at least a one molecular proportion of formaldehyde while maintaining a pH in the range of from about 8.0 to about 9.0 and a temperature in the range of from about 20° C. to about 50° C.

11. A process as described in claim 10 wherein the α-acetamidoacetophenone is p-nitro-α-acetamidoacetophenone.

12. In a process for the preparation of an α-acetamido-β-hydroxypropiophenone, the step comprising reacting a one molecular proportion of an α-acetamidoacetophenone having the formula

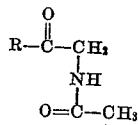

wherein R represents a phenyl radical selected from the class consisting of the unsubstituted phenyl radical and substituted phenyl radicals containing as their substituent groups halogens, nitro groups, alkyl groups, and alkoxy groups; and an aqueous solution containing at least a one molecular proportion of formaldehyde at a temperature in the range of from about 20° C. to about 50° C. while maintaining a pH in the range of from about 8.0 to about 9.0 by the addition of an alkali metal bicarbonate and acetic acid.

13. A process as described in claim 12 wherein the α-acetamidoacetophenone is p-nitro-α-acetamidoacetophenone.

OLIVER DE GARMO.
DAVID B. GUTHRIE.

References Cited in the file of this patent
UNITED STATES PATENTS

| Number | Name | Date |
| --- | --- | --- |
| 2,515,239 | Long | July 18, 1950 |
| 2,516,098 | Bambas | July 25, 1950 |
| 2,538,763 | Crooks et al. | Jan. 23, 1951 |
| 2,545,092 | Long et al. | Mar. 13, 1951 |
| 2,562,107 | Long | July 24, 1951 |